United States Patent
Fujimoto

(10) Patent No.: US 9,517,781 B2
(45) Date of Patent: Dec. 13, 2016

(54) AIR SPRING FOR RAILROAD CAR

(75) Inventor: Kenji Fujimoto, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 14/125,800

(22) PCT Filed: Jul. 8, 2011

(86) PCT No.: PCT/JP2011/065723
§ 371 (c)(1),
(2), (4) Date: Dec. 12, 2013

(87) PCT Pub. No.: WO2013/008290
PCT Pub. Date: Jan. 17, 2013

(65) Prior Publication Data
US 2014/0117597 A1 May 1, 2014

(51) Int. Cl.
*B61F 5/08* (2006.01)
*B61F 5/02* (2006.01)
(Continued)

(52) U.S. Cl.
CPC ............... *B61F 5/08* (2013.01); *B60G 11/62* (2013.01); *B61F 5/02* (2013.01); *B61F 5/10* (2013.01); *F16F 9/0454* (2013.01); *F16F 13/002* (2013.01)

(58) Field of Classification Search
CPC ............. B60G 11/62; B61F 5/02; B61F 5/08; B61F 5/10; F16F 13/002; F16F 9/0454
See application file for complete search history.

(56) References Cited

U.S. PATENT DOCUMENTS 3,479,053 A * 11/1969 Moulton ................. 280/104
4,690,388 A * 9/1987 Harrison ................. 267/35
(Continued)

FOREIGN PATENT DOCUMENTS

DE 102009044627 A1 * 5/2011
JP 51-132494 * 10/1976
(Continued)

OTHER PUBLICATIONS

International Search Report, dated Oct. 11, 2011, issued in corresponding application No. PCT/JP2011/065723.

*Primary Examiner* — Thomas J Williams
*Assistant Examiner* — Mariano Sy
(74) *Attorney, Agent, or Firm* — Westerman, Hattori, Daniels & Adrian, LLP

(57) ABSTRACT

An air spring for railroad cars includes an air spring part formed by an upper support on a vehicle body side, an intermediate support arranged therebelow, and a diaphragm made of rubber and extending between the upper support and the intermediate support; and an elastic mechanism b formed by a rubber mass 5 interposed between the intermediate support and a lower support 4 on a bogie side arranged therebelow. The rubber mass 5 has an end in contact with the lower support 4 formed as an enlarged end 5A increasing in diameter as approaching the lower support 4 in a vertical direction. An outer circumferential portion of this enlarged end is fitted in and bonded to an annular groove 12 formed in the lower support 4, and the annular groove 12 has an annular bottom 12A inclined to decrease in height radially outwards to have an annular tapered bottom 12a.

6 Claims, 4 Drawing Sheets

(51) Int. Cl.
    *F16F 9/04*         (2006.01)
    *B60G 11/62*      (2006.01)
    *B61F 5/10*         (2006.01)
    *F16F 13/00*      (2006.01)

(56) References Cited

U.S. PATENT DOCUMENTS

| | | |
|---|---|---|
| 4,781,365 A | 11/1988 | Harrison |
| 5,518,227 A | 5/1996 | Whelan |
| 2009/0039574 A1 | 2/2009 | Cook |
| 2010/0194056 A1* | 8/2010 | Nanri ............................ 277/587 |
| 2014/0230687 A1* | 8/2014 | Jackson et al. ............ 105/198.1 |

FOREIGN PATENT DOCUMENTS

| | | |
|---|---|---|
| JP | 51-132494 U | 10/1976 |
| JP | 60-226308 A | 11/1985 |
| JP | 60-249748 A | 12/1985 |
| JP | 62-67341 A | 3/1987 |
| JP | 07-503516 A | 4/1995 |
| JP | 2001-140977 A | 5/2001 |
| JP | 2005-147220 A | 6/2005 |
| JP | 2005-231464 A | 9/2005 |
| JP | 2007-046718 A | 2/2007 |
| JP | 2007-113649 A | 5/2007 |
| JP | 2008-302845 A | 12/2008 |
| JP | 2010-535999 A | 11/2010 |
| WO | WO 2009107679 A1 * | 9/2009 |

* cited by examiner

AIR SPRING FOR RAILROAD CAR

TECHNICAL FIELD

The present invention relates to an air spring for railroad cars, and more particularly to an air spring for railroad cars including an air spring part formed by an upper support on a vehicle body side, an intermediate support arranged therebelow, and a diaphragm made of an elastic material and extending between the upper support and the intermediate support; and an elastic mechanism formed by an elastic member interposed between the intermediate support and a lower support on a bogie side arranged therebelow.

BACKGROUND ART

Air springs for railroad cars of this type have been known, as disclosed in Patent Document 1 and Patent Document 2. These springs are designed to include an elastic mechanism having a laminated rubber structure and integrally attached under an air spring part, so that the railroad car can exhibit a favorable suspension performance with these two types of springs combined and arranged in series.

The rubber and a lower support that form the elastic mechanism are usually joined together by bonding (such as vulcanized adhesion or by adhesive). To achieve a favorable bonding strength between the rubber and the lower support, as is known, an end of the rubber in contact with the lower support is enlarged in diameter toward the lower support so as to have a widen end shape (i.e., enlarged toward the end), as shown in Patent Document 3 (Suspension device for railroad cars). This technique is also used in other technical fields than air springs for railroad cars, for example as shown in Patent Document 4 (Seismic isolation device).

As load conditions and the like for air springs for railroad cars are more and more stringent, a problem that the end of an elastic member in the elastic mechanism tends to easily separate from the lower support has emerged. The elastic member such as rubber may have an end processed to have a structure in which the elastic member is downward enlarged with a smooth concave curve surface and connected to the lower support (see FIG. 2), a structure in which the lower end of the elastic member at the outer peripheral edge has a certain thickness in the vertical direction (see FIG. 4), or a two-stage downward enlarged structure with an upper, first concave curve surface and a lower, second concave curve surface (see FIG. 3). There is a problem wherein the detachment or separation of the lower end of the elastic member can readily occur from the outer periphery in any of the elastic mechanisms having these structures.

The rubber member (as one example of an elastic material) in the elastic mechanism is usually made by molding with the use of the lower support. Rubber is poured onto the lower support that is coated with adhesive in advance. It has been found out that the coat of adhesive flows away with the in-flowing rubber in the vulcanization process of rubber (when the elastic material is poured in), so that there is very little or almost no adhesive left at ends, because of which separation would easily occur at the ends. This problem occurs similarly with other elastic materials than rubber such as synthetic resin having elasticity.

PRIOR ART DOCUMENTS

Patent Documents

Patent Document 1: JP 2007-046718 A
Patent Document 2: JP 2005-231464 A
Patent Document 3: JP 2008-302845 A
Patent Document 4: JP 2005-147220 A

SUMMARY OF THE INVENTION

Problems to be Solved by the Invention

An object of the present invention is to provide an air spring for railroad cars with an improvement to reduce or eliminate occurrence of defects by preventing "bond separation" failures in which a lower end of an elastic material such as rubber separates from a lower support, based upon a review of the structure of the part where the elastic material makes contact with the lower support.

Solutions to the Problems

The invention as described herein is characterized in that an air spring for railroad cars includes:

an air spring part a formed by an upper support 1 on a vehicle body side, an intermediate support 2 arranged below the upper support 1 and a diaphragm 3 made of an elastic material and extending between the upper support 1 and the intermediate support 2; and an elastic mechanism b formed by an elastic member 5 interposed between the intermediate support 2 and a lower support 4 on a bogie side arranged below the intermediate support 2, the elastic member 5 having an end in contact with the lower support 4 is formed as an enlarged end 5A which increases in diameter as approaching the lower support 4 in a vertical direction, an outer circumferential portion of this enlarged end 5A is fitted in and bonded to an annular groove 12 formed in the lower support 4, and the annular groove 12 having an annular bottom 12A is inclined to decrease in height radially outwards to have an annular tapered bottom 12a.

The invention as described herein is characterized in that, in the air spring for railroad cars, the annular bottom 12A is configured to have an annular horizontal outer peripheral bottom 12c that is horizontal and continuous with a radially outer side of the annular tapered bottom 12a.

The invention as described herein is characterized in that, in the air spring for railroad cars, the elastic member 5 is interposed between the intermediate support 2 and the lower support 4 in a state where the elastic member has a generally barrel-shaped outer contour having a largest diameter in a middle part in a height direction.

The invention as described herein is characterized in that, in the air spring for railroad cars, the elastic member 5 is made of rubber.

Effects of the Invention

According to the invention described herein, as will be described in detail in the Embodiment section, an enlarged end is bonded to an annular groove in a wider area, so that there is no (or less) possibility that the adhesive applied in the annular groove will flow out of the annular groove with the in-flowing unvulcanized rubber during the forming. Therefore, a necessary and sufficient amount of adhesive is secured, so that the downward enlarged end and the annular groove, or the lower support, are firmly bonded together as intended. Since the bottom of the annular groove is formed as an annular tapered bottom that is inclined at an angle such that the height decreases radially outwards, no air pockets are formed when unvulcanized rubber is poured in during the molding, which provides the advantage of stable product quality. By thus reviewing the structure of the part where the elastic material and the lower support make contact with each other, the "bond separation" failures in which the lower end of the elastic material separates from the lower support are prevented or reduced, and so an air spring for railroad cars with an improvement to reduce or eliminate occurrence of defects can be provided.

According to the invention as described herein, no air bubbles remain in inner corners when the elastic material is poured in during the molding, and the contact area between an annular outer circumferential portion of the downward enlarged end and the annular bottom is increased, which additionally provides the advantage of a stronger bond by the adhesive. Namely, the effects by the invention according to claim 1 described above are enhanced.

In the present invention, described herein, the elastic member may have a generally barrel-shaped outer contour having a largest diameter in a middle part in a height direction, or as as described herein, the elastic member may be made of rubber that has excellent versatility and cost performance.

EMBODIMENTS OF THE INVENTION

Embodiments of an air spring for railroad cars according to the present invention will be hereinafter described with reference to the drawings. FIG. 2(a) to FIG. 4(a) illustrate enlarged ends 5A in Embodiments 1 to 3, while FIG. 2(b) to FIG. 4(b) illustrate Variation Examples 1 to 3.

Embodiment 1

Figure 1:
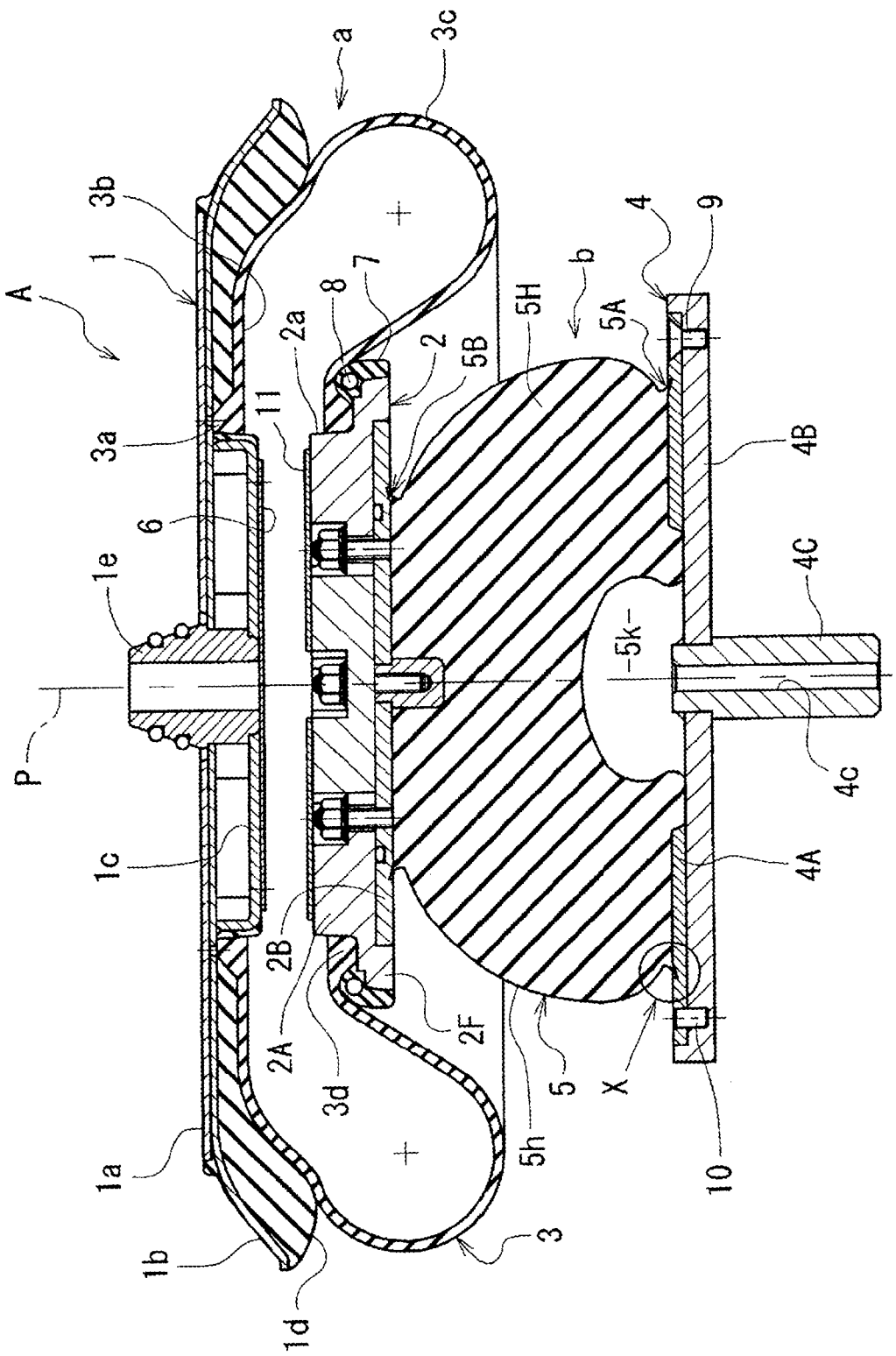
FIG. 1 is a cross-sectional view showing the structure of an air spring for railroad cars.

FIG. 1 and FIG. 2 show an air spring for railroad cars (hereinafter simply referred to as "air spring") A. This air spring A is configured to include an air spring part a formed by an upper support 1 on the vehicle body side, an intermediate support 2 arranged therebelow, and a diaphragm 3 made of rubber (one example of an elastic material) extending between the former two, and an elastic mechanism b formed by the intermediate support 2, a lower support 4 on the bogie side arranged therebelow, and an elastic member 5 interposed between the intermediate and lower supports. The upper support 1 is supported on a vehicle body of a railroad car (not shown) via a cylindrical boss 1e having a vertical center axis P in its center, while the lower support 4 is supported on a bogie (not shown) via a cylindrical shaft 4C having a center axis P in its center.

The upper support 1 is configured to be disc-shaped, with an upper disc 1a, a lower disc 1b, a bottomed cylindrical portion 1c, an upper seat 1d, the cylindrical boss 1e, and others. The upper disc 1a and the lower disc 1b are both steel sheets having a circular shape when viewed from above or below and stacked upon one another, with the cylindrical boss 1e passing through them at the center. The bottomed cylindrical portion 1c is a bowl-shaped steel sheet fixedly attached to the lower face of the lower disc 1b, and the upper seat 1d is a ring-like rubber member integrally attached to the lower side of the lower disc 1b on the radially outer side of the bottomed cylindrical portion 1b. The cylindrical boss 1e having the center axis P is secured to extend through the upper and lower discs 1a and 1b and the bottomed cylindrical portion 1c. The upper seat 1d is formed to be thin around the outer circumference of the bottomed cylindrical portion 1c and thick under and inside the lower disc 1b, with the thickness increasing downward radially outwards (to have a generally inverted bowl shape). A stainless steel annular slip plate 6 is integrally attached by bonding or the like to the lower face of the bottomed cylindrical portion 1c.

The diaphragm 3 is formed to include an upper bead 3a press-fitted into an upper edge portion (in the form of a ring around the center axis P) formed by the lower disc 1b, bottomed cylindrical portion 1c, and upper seat 1d, an upper disc portion 3b received by the upper seat 1d in a wide area, a main body 3c that laterally extends most, and a lower bead 3d fitted to the intermediate support 2. The lower bead 3d is press-fitted into a lower edge portion (in the form of a ring around the center axis P) formed by an outer circumferential surface 2a of the main disc 2A and an attachment ring 7 snugly fitted to the outer circumference of a flange part 2F. Namely, the diaphragm 3 is configured to have a structure known as a "self-sealing diaphragm" in which the diaphragm 3 is snugly fitted to both of the upper support 1 and the intermediate support 2 without a fastening structure with bolts or the like, just like a tire and a wheel of a car.

The intermediate support 2 is configured to include the main disc 2A made of metal and having the outer circumferential surface 2a and the flange part 2F, and an inner circumferential plate 2B made of metal and fastened to the lower face of the main disc 2A with bolts. The attachment ring 7 integrally attached to the outer circumference of the flange part 2F is a ring-like rubber member having a reinforcing ring 8 inside. An annular slip plate 11 made of a low-friction material such as fluorine resin is integrally attached to the upper face of the main disc 2A.

The lower support plate 4 is formed by a placement disc 4A supporting the elastic member 5 that is integral therewith, a generally shallow plate-like support disc 4B receiving the placement disc 4A fitted inside, and the previously mentioned cylindrical shaft 4C fixedly attached to the support disc 4B. The placement disc 4A is fixed to the support disc 4B with the use of screws 9 and pins 10. The lower support plate 4 is a circular member having the center axis P in its center.

The elastic member 5 is formed by a rubber mass interposed between, and bonded by vulcanized adhesion to each of, the placement disc 4A, support disc 4B, and inner circumferential plate 2B thereabove and therebelow. This rubber mass 5 increases in diameter downwards like a convex lens, but decreases in diameter from the vicinity of the lower end toward the lower end, and increases in diameter again at the very lower end. In other words, the lower end is downward enlarged. Moreover, the upper end is likewise upward enlarged. The cylindrical shaft 4C has an insertion hole 4c extending through the shaft vertically, and a cavity 5k communicating with the insertion hole 4c is formed above the cylindrical shaft 4C and a central portion of the support disc 4B in the rubber mass 5.

The rubber mass 5 is interposed between the intermediate support 2 and the lower support 4 in a state with a generally barrel-shaped contour having a largest diameter in a middle part in the height direction, and one end (i.e., lower end) of the rubber mass 5 in contact with the lower support 4 is formed as a downward enlarged end (enlarged end) 5A increasing in diameter as approaching the lower support 4 in the vertical direction. One end (i.e., upper end) of the rubber mass 5 in contact with the intermediate support 2 is formed as an upward enlarged end (i.e., enlarged end) 5B increasing in diameter as approaching the intermediate support 2 in the vertical direction.

Figure 2A:
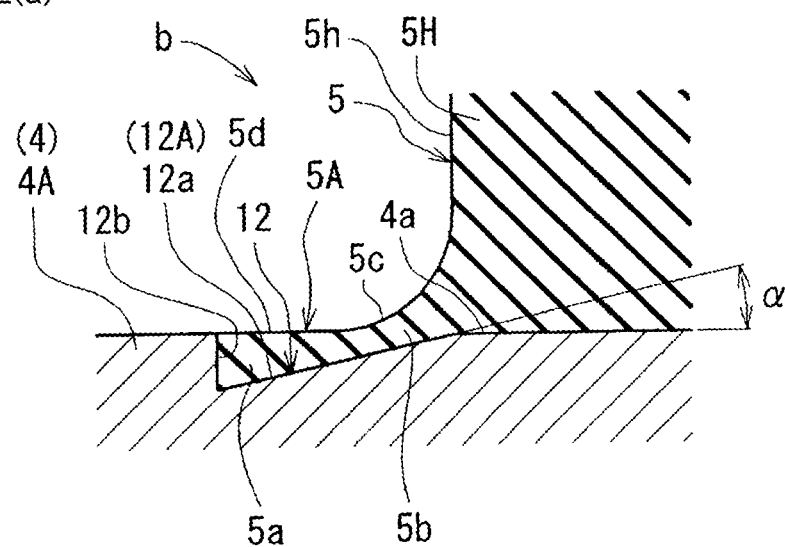
FIG. 2 illustrates essential parts of an enlarged end, FIG. 2(a) showing Embodiment 1 and FIG. 2(b) showing Variation Example 1.
Figure 2B:
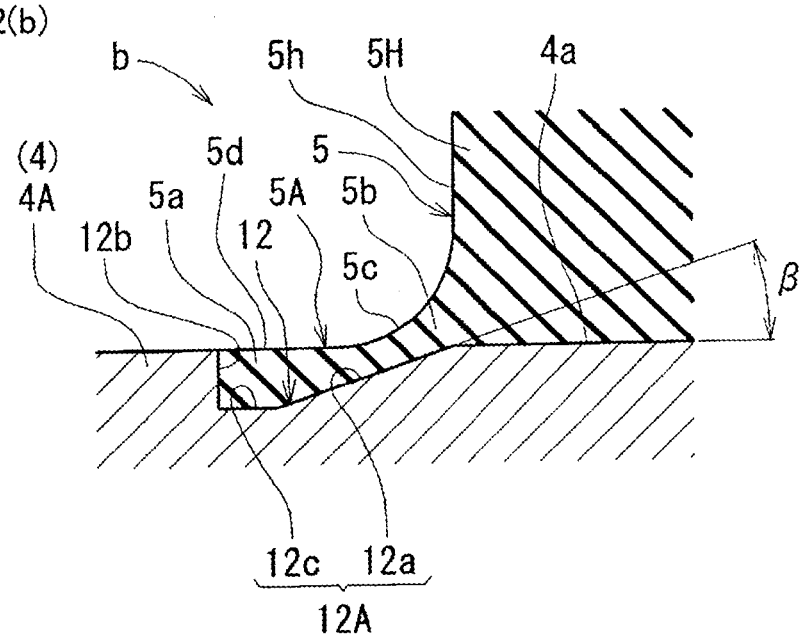

Next, the downward enlarged end 5A will be described. FIG. 2(a) and FIG. 2(b) both show part X in FIG. 1 to a larger scale. One end of the rubber mass 5 in contact with the lower support, i.e., the downward enlarged end 5A, is formed as an enlarged end increasing in diameter as approaching the lower support 4 in the vertical direction, and the outer circumferential portion of the enlarged end is fitted in and bonded to the annular groove 12 formed in the lower support 4. The annular groove 12 in the shape of a ring around the center axis P when viewed from above and below is formed to have an annular tapered bottom 12a inclined at an angle α relative to the horizontal, and an outer circumferential wall 12b. Namely, the annular groove 12 is configured to have the annular tapered bottom 12a inclined such that the height position of the annular bottom 12A decreases radially outwards.

The downward enlarged end 5A at the lower end of the elastic member 5 is formed by, as shown in FIG. 2(a), an annular outer circumferential portion 5a fitted in the annular groove 12 formed in the placement disc 4A, and an annular transition part 5b having a smooth concave curve line, i.e., an edge line 5c connecting the upper surface 5d of the annular outer circumferential portion 5a and an outer circumferential surface 5h of the rubber mass main body 5H.

To make the rubber mass 5, although not shown, a forming technique may be employed wherein unvulcanized rubber is poured into a mold, with the lower support 4 mounted in the mold, for example. In this case, the upper surface of the lower support 4 may be coated with adhesive in advance, so that the adhesive can provide further bond between the rubber mass 5 and the lower support 4 in addition to the bonding effect (i.e., vulcanized adhesion) achieved by the vulcanization to the lower support 4.

With the conventional air spring, i.e., an air spring for railroad cars with a lower support simply provided with a flat upper surface, when unvulcanized rubber is poured onto the lower support coated with adhesive, the adhesive applied in advance would flow away with the flow of the unvulcanized rubber from radially inside to outside, resulting in poor bond at outer circumferential ends, because of which there was the tendency of premature separation (end separation).

In this respect, in the air spring for railroad cars according to the present invention shown in FIG. 2(a), the rubber mass 5 is provided with the downward enlarged end 5A that is formed by pouring rubber to be fitted in the annular groove 12 that is recessed downward from the upper surface 4a of the placement disc 4A, so that the rubber is bonded in a wider area with the annular tapered bottom 12a and the outer circumferential wall 12b, and that there is no (or less) possibility that the adhesive applied in the annular groove 12 will flow out of the annular groove 12 with the in-flowing unvulcanized rubber during the forming. A necessary sufficient amount of adhesive is thus secured, so that the downward enlarged end 5A and the annular groove 12, or the lower support 4, are firmly bonded together.

While the bonding effect by the vulcanization of rubber and the bonding effect by the adhesive are used in combination in this Embodiment 1, a sufficient bond can be achieved only with a coat of adhesive. The air spring is thus improved so that there will be no or less occurrence of defects, as the intended bonding effect is achieved by the adhesive between the downward enlarged end 5A and the placement disc 4A (lower support 4) and "bond separation" failures in which the lower end of the rubber mass 5 separates from the lower support 4 are prevented.

In addition, as the annular tapered bottom 12a is inclined at an angle α such that the height decreases radially outwards, no air pockets are formed when unvulcanized rubber is poured in during the molding, which provides the advantage of stable product quality. If, for example, although not shown, the annular groove 12 is formed by perpendicular inner and outer circumferential walls and a horizontal annular bottom wall to have a rectangular cross-sectional shape, air bubbles may remain in inner corners where the annular bottom wall and the inner circumferential wall join because of the viscosity of unvulcanized rubber poured in during the molding, because of which bond separation would easily occur, and which was an impediment to stabilization of product quality. The air spring according to the present invention having the annular tapered bottom 12a is free of such trouble.

The downward enlarged end 5A may be formed to correspond to the annular bottom 12A having an annular horizontal outer peripheral bottom 12c that is horizontal and continuous with the annular tapered bottom 12a on the radially outside, as shown in FIG. 2(b). This structure ensures that no air bubbles remain in the inner corners when unvulcanized rubber is poured in during the molding, and provides the advantage of a stronger bond by the adhesive, as the contact area between the annular outer circumferential portion 5a of the downward enlarged end 5A and the annular bottom 12A is increased as compared to that of FIG. 2(a). The angle β of the annular tapered bottom 12a relative to the upper surface 4a is slightly larger than the angle α shown in FIG. 2(a), but may be smaller or equal to α. The same applies to the angle β in FIG. 3(b) and FIG. 4(b).

Embodiment 2

Figure 3A:
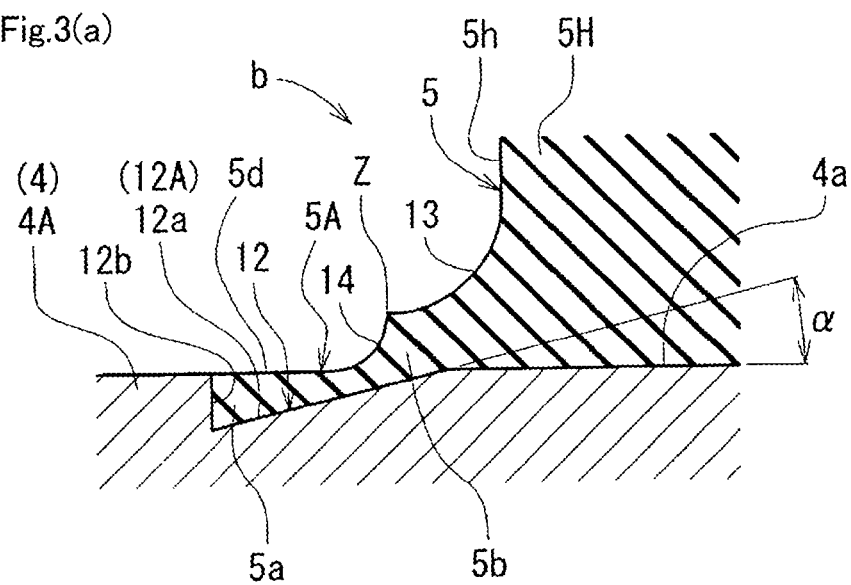
FIG. 3 illustrates essential parts of an enlarged end, FIG. 3(a) showing Embodiment 2 and FIG. 3(b) showing Variation Example 2.

The downward enlarged end 5A may have a shape in which the edge line 5c shown in FIG. 2(a) is replaced with an upper large curved portion 13 and a lower small curved portion 14, as shown in FIG. 3(a). Namely, a large and small curved portions 13 and 14, which are curved surfaces warped in a circular arc (or quasi-circular arc) shape to be concave toward outside when viewed in cross section in the vertical direction, are formed continuously in two stages.

With this shape, when the elastic mechanism b undergoes a large lateral deformation and the downward enlarged end 5A bends, the zenith Z connecting the large and small curved portions 13 and 14 that are two stage curved surfaces will be the point of contraflexure, i.e., since the zenith Z where the thickness is large will be located at the deepest point of the bend, no deep wrinkles will be formed in the bending part. Accordingly, the downward enlarged end 5A will withstand repeated deformation and be free of chipping or cracking that may cause failure or fracture of the elastic member 5, and thus the durable life of the entire elastic member 5 can be ensured over a long period of time.

Figure 3B:
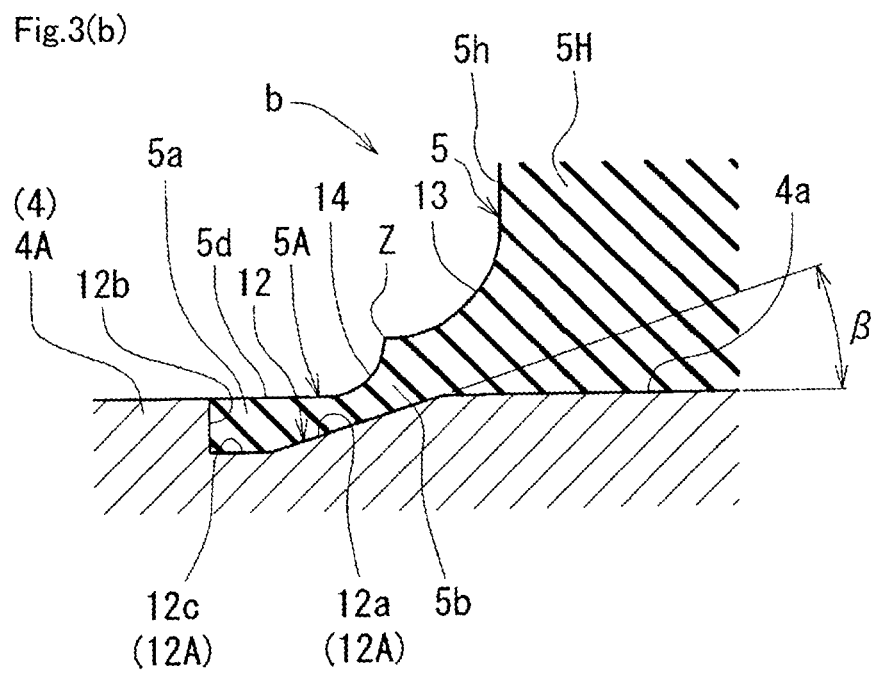

The downward enlarged end 5A may be formed to correspond to the annular bottom 12A having an annular horizontal outer peripheral bottom 12c that is horizontal and continuous with the annular tapered bottom 12a on the radially outside, as shown in FIG. 3(b). This variation example of Embodiment 2 shown in FIG. 3(b) provides the same effects (of a stronger bond) as the variation example of Embodiment 1 shown in FIG. 2(b).

Embodiment 3

Figure 4A:
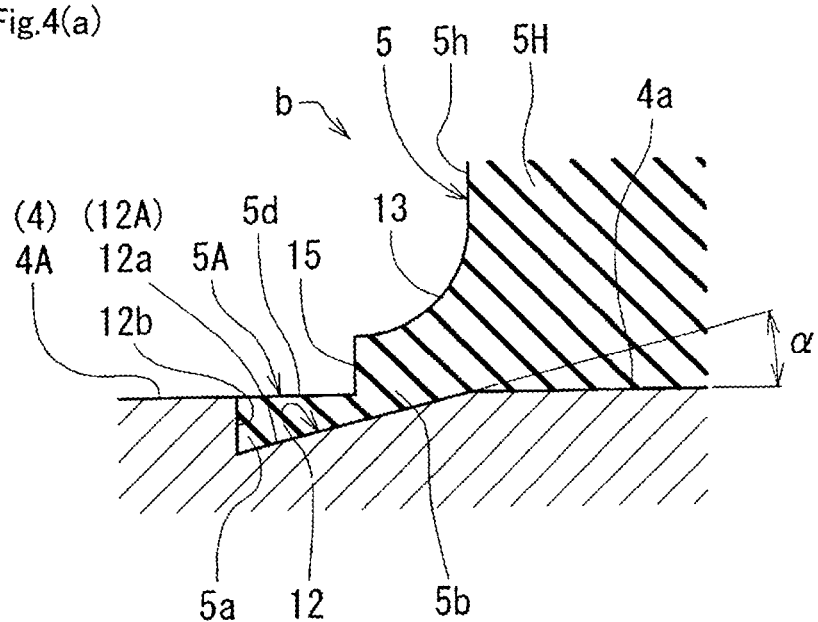
FIG. 4 illustrates essential parts of an enlarged end, FIG. 4(a) showing Embodiment 3 and FIG. 4(b) showing Variation Example 3

The downward enlarged end 5A may have a shape in which the small curved portion 14 shown in FIG. 3 is replaced with a vertical wall 15 that forms a right angled corner between itself and the upper surface 5d of the annular outer circumferential portion 5a, as shown in FIG. 4(a).

Figure 4B:
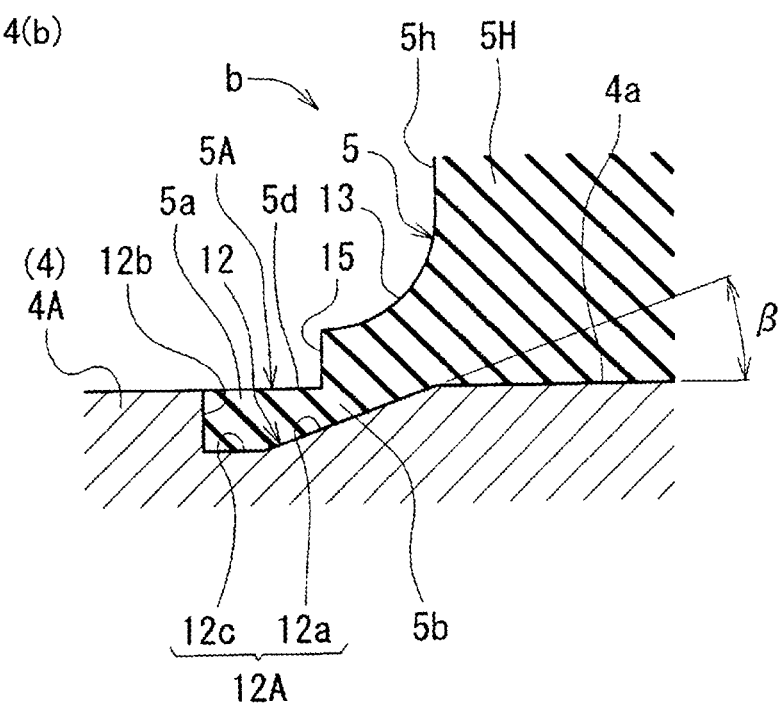

The downward enlarged end 5A may be formed to correspond to the annular bottom 12A having an annular horizontal outer peripheral bottom 12c that is horizontal and continuous with the annular tapered bottom 12a on the radially outside, as shown in FIG. 4(b). This variation example of the small curved portion of Embodiment 3 shown in FIG. 4(b) provides the same effects (of a stronger bond) as the variation example of Embodiment 1 shown in FIG. 2(b).

Other Embodiments

The elastic mechanism b may be configured to have a laminated rubber structure formed by several layers of an elastic material such as rubber and one or more plate(s) of a hard material such as metal, wherein the layer and the plate are alternately stacked with each other, and interposed between the intermediate support 2 thereabove and the lower support 4 therebelow. The structure of the downward enlarged end 5A shown in FIG. 2 to FIG. 4 may also be applied to the upward enlarged end (i.e., enlarged end) 5B.

DESCRIPTION OF REFERENCE SIGNS

1: Upper support
2: Intermediate support
3: Diaphragm
4: Lower support
5: Elastic member
5A: Enlarged end
12: Annular groove
12A: Annular bottom
12a: Annular tapered bottom
12c: Annular horizontal outer peripheral bottom
a: Air spring part
b: Elastic mechanism

The invention claimed is:

1. An air spring for railroad cars, comprising:
an air spring part formed by an upper support on a vehicle body side, an intermediate support arranged below the upper support, and a diaphragm made of an elastic material and extending between the upper support and the intermediate support; and
an elastic mechanism formed by an elastic member interposed between said intermediate support and a lower support on a bogie side arranged below the intermediate support,
said elastic member having an end in contact with said lower support formed as an enlarged end increasing in diameter as approaching said lower support in a vertical direction, an outer circumferential portion of this enlarged end being fitted in and bonded to an annular groove formed in said lower support, and said annular groove having an annular bottom inclined to decrease in height radially outwards to have an annular tapered bottom, an annular horizontal outer peripheral bottom that is horizontal and continuous with a radially outer side of said annular tapered bottom, and an outer circumferential wall has an angle which is perpendicular to an upper surface of the lower support, and an angle between the annular horizontal outer peripheral bottom and the annular tapered bottom is substantially different from the perpendicular outer circumferential wall angle.

2. The air spring for railroad cars according to claim 1, wherein said elastic member is interposed between said intermediate support and said lower support in a state where the elastic member has a generally barrel-shaped outer contour having a largest diameter in a middle part in a height direction.

3. The air spring for railroad cars according to claim 2, wherein said elastic member is made of rubber.

4. The air spring for railroad cars according to claim 1, wherein said elastic member is made of rubber.

5. The air spring for railroad cars according to claim 1, wherein said elastic member is interposed between said intermediate support and said lower support in a state where the elastic member has a generally barrel-shaped outer contour having a largest diameter in a middle part in a height direction.

6. The air spring for railroad cars according to claim 1, wherein said elastic member is made of rubber.

* * * * *